United States Patent [19]
Dobner

[11] 4,181,366
[45] Jan. 1, 1980

[54] INTEGRATION OF REGENERATIVE BRAKING AND CONVENTIONAL BRAKING

[75] Inventor: Donald J. Dobner, Utica, Mich.

[73] Assignee: General Motors Corporation, Detroit, Mich.

[21] Appl. No.: 927,853

[22] Filed: Jul. 25, 1978

[51] Int. Cl.$^2$ .............................. B60T 13/74
[52] U.S. Cl. .................... 303/3; 180/65 R; 188/156; 318/371
[58] Field of Search ............... 303/3, 15; 188/156; 318/628, 371; 244/83 D; 180/65 R; 60/574, 576, 577; 91/359, 363 R, 364

[56] References Cited

U.S. PATENT DOCUMENTS

| 3,171,505 | 3/1965 | Imelmann | 180/65 R |
| 3,454,122 | 7/1969 | Grady | 180/65 R |
| 3,621,929 | 11/1971 | Oberthur | 180/65 R |
| 3,731,168 | 5/1973 | Strifler | 318/371 |
| 4,005,759 | 2/1977 | Farr | 303/3 R |

Primary Examiner—Reinhard J. Eisenzopf
Attorney, Agent, or Firm—D. D. McGraw

[57] ABSTRACT

A vehicle braking system with regenerative braking and conventional braking, the system integrating the two braking forces to obtain a consistent total braking effort and brake pedal feel when the regenerative braking force decreases with the decrease in vehicle speed.

2 Claims, 2 Drawing Figures

INTEGRATION OF REGENERATIVE BRAKING AND CONVENTIONAL BRAKING

The invention relates to vehicle braking and more particularly to a braking system and components thereof which utilize regenerative braking to provide a portion of the total braking force when the brake system is actuated. In such an arrangement it is desirable to integrate regenerative braking with the conventional braking system of the vehicle so that the brake pedal behavior will remain unchanged from that to which the vehicle operators have become accustomed. The typical brake system has a pedal force to pedal displacement characteristic which produces a characteristic braking force at the vehicle wheels. Since the amount of regenerative braking will vary as the vehicle speed changes during a stop, it is preferable that the vehicle brake system be controlled to provide the desired amount of total braking force, made up of regenerative braking force and braking force generated in the usual manner in the braking system. The total braking force so obtained should be proportional to the force exerted on the brake pedal by the vehicle operator. If the usual brake system should be operated independently of regenerative braking, the vehicle operator would have to modulate the brake pedal as the amount of regenerative braking effort changed during the stop. The brake pedal would therefore appear to have a variable displacement/force relationship which might be interpreted as erratic under some conditions and would require greater care and skill on the part of the vehicle operator than does the conventional braking system when no regenerative braking is present.

In the preferred embodiment disclosed, the regenerative braking force and the conventional system braking force are integrated by use of a brake master cylinder having a compressible link between the brake pedal and the pressure generating piston. It provides for application of a force to the brake pedal which is proportional to the regenerative braking force. The regenerative braking force feedback will subtract from the conventional system braking force which would otherwise be generated by the master cylinder, and will produce a negligible change in the total vehicle braking force, keeping the brake pedal force and displacement sensed by the vehicle operator consistent with the total vehicle braking force obtained. Thus the characteristic of the overall vehicle braking system will appear to remain substantially constant even as the regenerative braking force varies throughout the stop or even from stop to stop. While the preferred embodiment disclosed shows a conventional hydraulic vehicle braking system, the invention is also applicable to other braking systems operated pneumatically, mechanically, electrically, or some combination of various conventional brake systems.

It is a concept of the invention that the vehicle brake system includes a brake force generator which is adapted to be controlled by a total braking effort demand signal generated by actuation of a vehicle operator operated device in accordance with the desired total vehicle braking effort. The vehicle wheels have braking means actuatable by the brake force generator to generate vehicle braking effort. The system includes regenerative braking means responsive to rotation of the vehicle wheels when the brake force generator is actuated. The regenerative braking means then exerts a regenerative braking effort on the wheels as a function of the speed of rotation of the wheels. A signal generating means responsible to the amount of regenerative braking effort so exerted on the wheels generates a regenerative braking signal reflecting the regenerative braking effort on the wheels. This signal is delivered to the brake force generator, which responds to the regenerative braking signal and the total braking effort demand signal to maintain the amount of braking effort, generated by the brake force generator and delivered as vehicle braking effort to the wheels through the wheel braking means, substantially at the difference between the desired total braking effort on the wheels and the regenerative braking effort on the wheels. A total brake effort reaction signal is generated and returned to the vehicle operator to give him indication of the total braking effort acting on the wheels.

Figures 1, 2:
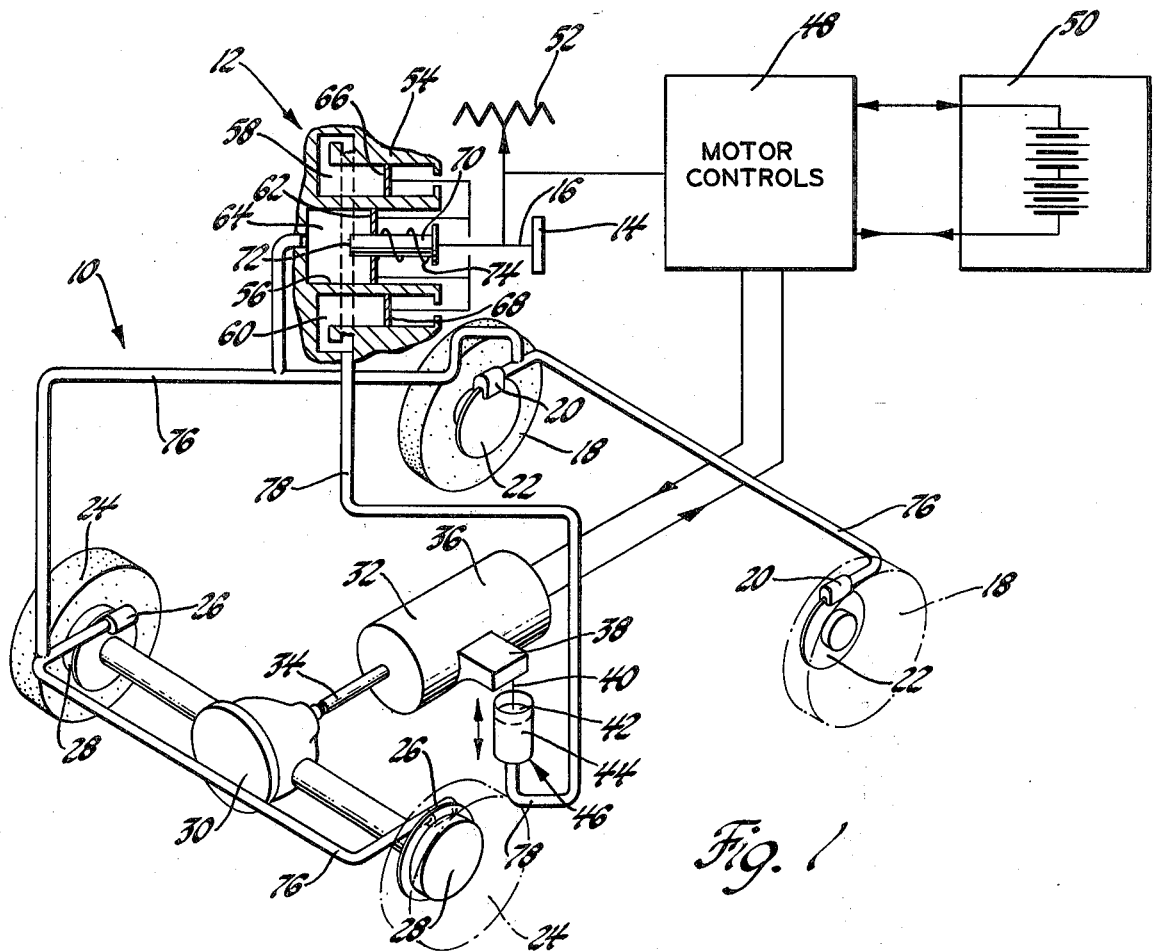
FIG. 1 is a schematic representation of a vehicle brake system embodying the invention and having parts broken away and in section.
FIG. 2 is a schematic representation, with parts broken away and in section, of a brake force generator for the system of FIG. 1.

The vehicle brake system 10 includes a brake force generator 12 actuated by a brake pedal 14 through a push rod 16. The vehicle front wheels 18 are provided with wheel braking means 20 schematically illustrated as disc brake calipers arranged so that when they are actuated the discs 22 are frictionally engaged. The rear wheels 24 are provided with wheel braking means 26, schematically illustrated as wheel cylinders actuating drum brake shoes to engage the brake drums 28. The rear wheels 24 are driven through a suitable rear axle and differential drive assembly 30. The particular vehicle illustrated is provided with an electric motor 32 for motive power. Motor 32 drives the assembly 30 through a shaft 34. Motor 32 is also the regenerative braking means of the brake system. The motor housing 36 has a torque arm 38 extending outwardly and acting through a rod 40 to move a piston 42 in a cylinder 44 and generate a pressure in the cylinder 44 which reflects the torque of the motor when the vehicle is in a braking mode. Thus the rod 40, piston 42 and cylinder 44, actuated by arm 38, comprises signal generating means 46. Motor 32 is controlled by suitable motor controls 48 and powered by a source of electricity identified as batteries 50. In the particular embodiment illustrated in FIG. 1, an electric brake signal 52 is suitably connected so that brake actuating movement of the brake pedal 14 will cause the motor controls 48 to actuate motor 32 in the regenerative braking mode.

Brake force generator 12 is schematically illustrated as including a housing 54 having formed therein a first cylinder 56 and feedback cylinders 58 and 60. A piston 62 is reciprocably received in cylinder 56 and defines with the forward end thereof a pressurizing chamber 64. Pistons 66 and 68 are respectively reciprocably received in feedback cylinders 58 and 60 and are connected to or formed as a part of piston 62 so that all three pistons move together in their respective chambers. Piston 62 is annular so that a reaction piston 70 extends therethrough with its forward end 72 being exposed to pressurizing chamber 64. Push rod 16 is connected to reaction piston 70 and can exert force on piston 62 through a compressible link schematically illustrated as spring 74.

Conduit 76 and branches thereof connect pressurizing chamber 64 with the front wheel braking means 20 and the rear wheel braking means 26. Another conduit 78 connects the chamber of cylinder 44 which may have fluid pressurized therein by movement of piston 42 to the feedback cylinders 58 and 60 of the brake force generator 12. Conduit 78 is therefore a regenerative braking signal delivery means which delivers that signal to the brake force generator 12.

The brake force generator 80 in FIG. 2 performs functionally in the same manner as does the brake force generator 12. Similar parts are therefore identified by the same reference characters. In this construction only one feedback cylinder is provided and this cylinder defines the annular regenerative chamber 82.

When the brake system is actuated the vehicle operator exerts a brake pedal force $F_p$ on the brake pedal and this force is transmitted through the push rod 16 to the piston 70. Spring 74 compressibly transmits the force to piston 62 and also to the brake fluid contained in pressurizing chamber 64. The brake force generated by the hydraulic brake system in chamber 64 reacts on the end surface 72 of piston 70, and on piston 62, with a force $F_h$ returning a reaction signal to the vehicle operator. The pressure which is the regenerative braking signal acts in regenerative chamber 82 against piston 66 with a force $F_r$ responsive to the regenerative braking force exerted by motor 32 on the rear wheels 24 through assembly 30. The force also returns a reaction signal to the vehicle operator, so that the combined reaction signals become a total braking effort reaction signal reflecting the total braking effort on the vehicle wheels. The remaining braking force required to meet the total demand for braking force by the vehicle operator is generated in chamber 64 and transmitted through conduit 76 to the front and rear wheel braking means. As the vehicle slows, the regenerative braking force decreases. Therefore there is less force $F_r$ acting on piston 66 and the piston 62 can move to further pressurize fluid in chamber 64 under influence of the spring 74 without changing the pedal travel of the brake pedal 14. Also, as force $F_r$ decreases $F_h$ increases, so that the net effect felt as reaction through push rod 16 and brake pedal 14 is substantially the same and continues to reflect total braking force.

What is claimed is:

1. A vehicle brake system comprising:
  rotatable vehicle wheels to be braked;
  a brake force generator adapted to be controlled by a total braking effort demand signal generated by the actuation of a vehicle operator in accordance with desired total vehicle braking effort on the wheels;
  wheel braking means for said vehicle wheels actuatable by said brake force generator to generate vehicle braking effort;
  regenerative braking means responsive to rotation of said wheels when said brake force generator is actuated to exert a regenerative braking effort on said wheels as a function of the speed of rotation of said wheels;
  signal generating means responsive to the amount of regenerative braking effort exerted on said wheels by said regenerative braking means to generate a regenerative braking signal reflecting the braking effort on said wheels caused by said regenerative braking means, and regenerative braking signal delivery means delivering said regenerative braking signal to said brake force generator;
  said brake force generator having means receiving and responsive to said regenerative braking signal and the total braking effort demand signal to maintain the amount of braking effort, generated by said brake force generator and delivered as vehicle braking effort to said wheels through said wheel braking means, at the difference between the desired total braking effort on said wheels and the regenerative braking effort on said wheels, said last named means generating and returning a total braking effort reaction signal to the vehicle operator reflecting the total braking effort on said wheels.

2. For use in a vehicle braking system having fluid pressure operated wheel brakes and selectively actuatable regenerative wheel braking means:
  a master cylinder for generating fluid pressure for operating the wheel brakes and having:
    a cylinder defining a fluid pressure generating chamber,
    a first piston and a second piston cooperating to define a pressure generating movable wall of said chamber,
    operator operated means for exerting a total braking force demand and moving said first piston in a pressure generating direction in said chamber,
    resilient means providing a compressible drive member between said first and second piston to urge said second piston to move with said first piston,
    and means acting on said second piston in opposition to said operator operated means and adapted to be responsive to a regenerative wheel braking signal from the regenerative wheel braking means,
  said means acting on said second piston when so responding and generating a force reflective of the regenerative braking force which, combined with the hydraulic braking force generated by the pressure in said fluid pressure generating chamber, equals the operator exerted total braking force demand as the regenerative braking force varies with changes in vehicle speed during braking.

* * * * *